United States Patent
Bhatia et al.

(10) Patent No.: US 12,161,123 B2
(45) Date of Patent: *Dec. 10, 2024

(54) FORMULA AND PROCESS FOR PRODUCING FROZEN SHEETED DOUGH

(71) Applicant: Rich Products Corporation, Buffalo, NY (US)

(72) Inventors: Sachin Bhatia, Tonawanda, NY (US); Mohammed M. Morad, Ypsilanti, MI (US)

(73) Assignee: Rich Products Corporation, Buffalo, NY (US)

( * ) Notice: Subject to any disclaimer, the term of this patent is extended or adjusted under 35 U.S.C. 154(b) by 450 days.

This patent is subject to a terminal disclaimer.

(21) Appl. No.: 17/237,275

(22) Filed: Apr. 22, 2021

(65) Prior Publication Data
US 2021/0235710 A1    Aug. 5, 2021

Related U.S. Application Data

(60) Continuation of application No. 15/048,068, filed on Feb. 19, 2016, now Pat. No. 11,013,239, which is a
(Continued)

(51) Int. Cl.
*A21D 10/02* (2006.01)
*A21D 2/16* (2006.01)
(Continued)

(52) U.S. Cl.
CPC ............ *A21D 10/02* (2013.01); *A21D 2/165* (2013.01); *A21D 2/181* (2013.01); *A21D 2/34* (2013.01);
(Continued)

(58) Field of Classification Search
CPC ............ A21D 10/02; A21D 2/34; A21D 8/00
See application file for complete search history.

(56) References Cited

U.S. PATENT DOCUMENTS 2,686,721 A    8/1954  Callaghan et al.
2,800,862 A    7/1957  Frederick
(Continued)

FOREIGN PATENT DOCUMENTS

CA    2573014 A1 *  2/2006
EP    0620974 A2    10/1994
(Continued)

OTHER PUBLICATIONS

Yamauchi JP2000245331A Machine Translation (Year: 2000).*
(Continued)

*Primary Examiner* — Felicia C Turner
(74) *Attorney, Agent, or Firm* — Michael Best & Friedrich LLP

(57) ABSTRACT

A process of producing a frozen sheeted dough, which can be prepared without using stress-free sheeting process and transferred directly from the freezer to oven without a proofing step. The process comprises mixing the dough ingredients comprising yeast and chemical leavening agents; resting the dough to form air cell structure; subjecting the dough to high stress sheeting compressions and freezing the dough. The frozen dough can be directly transferred to an oven without a proofing step. The resulting baked product has desirable texture and taste.

26 Claims, 6 Drawing Sheets

Related U.S. Application Data division of application No. 11/724,377, filed on Mar. 15, 2007, now Pat. No. 10,512,273.

(60) Provisional application No. 60/783,090, filed on Mar. 16, 2006.

(51) Int. Cl.
| | | |
|---|---|---|
| *A21D 2/18* | (2006.01) | |
| *A21D 2/34* | (2006.01) | |
| *A21D 6/00* | (2006.01) | |
| *A21D 13/17* | (2017.01) | |
| *A21D 13/22* | (2017.01) | |
| *A21D 13/41* | (2017.01) | |

(52) U.S. Cl.
CPC ............ *A21D 6/001* (2013.01); *A21D 13/17* (2017.01); *A21D 13/22* (2017.01); *A21D 13/41* (2017.01)

(56) References Cited

U.S. PATENT DOCUMENTS

| | | |
|---|---|---|
| 3,167,432 A | 1/1965 | Colby |
| 3,250,625 A | 5/1966 | Thelen |
| 3,250,627 A | 5/1966 | Thelen |
| 3,593,676 A | 7/1971 | Reid et al. |
| 3,615,680 A | 10/1971 | Henika et al. |
| 3,767,421 A * | 10/1973 | Gulstad .................. A21D 2/263 426/549 |
| 3,879,563 A | 4/1975 | Tucker et al. |
| 4,600,587 A | 7/1986 | Nomura et al. |
| 4,645,673 A | 2/1987 | Wilmes |
| 4,847,104 A | 7/1989 | Benjamin et al. |
| 4,957,426 A | 9/1990 | Hayashi |
| 4,966,778 A | 10/1990 | Benjamin et al. |
| 5,451,417 A | 9/1995 | Freyn et al. |
| 5,458,903 A | 10/1995 | Colson et al. |
| 5,968,570 A | 10/1999 | Paulucci |
| 6,312,741 B1 | 11/2001 | Navarro |
| 6,419,965 B1 | 7/2002 | Doaire et al. |
| 6,436,458 B2 | 8/2002 | Kuechle et al. |
| 10,512,273 B2 | 12/2019 | Bhatia et al. |
| 11,013,239 B2 | 5/2021 | Bhatia et al. |
| 2001/0043978 A1 | 11/2001 | Moder et al. |
| 2003/0049358 A1 | 3/2003 | Domingues |
| 2003/0064138 A1 | 4/2003 | Lonergan et al. |
| 2003/0082289 A1 | 5/2003 | Huxel |
| 2003/0157222 A1 | 8/2003 | Henry et al. |
| 2004/0037936 A1 | 2/2004 | Domingues |
| 2004/0058036 A1 | 3/2004 | Murty et al. |
| 2004/0213883 A1 | 10/2004 | Sadek et al. |
| 2004/0241283 A1 | 12/2004 | Domingues et al. |
| 2005/0027645 A1 | 3/2005 | Hiles et al. |
| 2005/0074534 A1 | 4/2005 | Goedeken et al. |
| 2005/0129821 A1 | 6/2005 | Goedeken et al. |
| 2005/0158439 A1 | 7/2005 | Zhang et al. |
| 2006/0134270 A1 | 6/2006 | Kunze et al. |
| 2007/0092619 A1 | 4/2007 | Ning et al. |

FOREIGN PATENT DOCUMENTS

| | | |
|---|---|---|
| FR | 2733669 A1 | 11/1996 |
| WO | WO0132023 A1 | 5/2001 |
| WO | WO03022060 A1 | 3/2003 |
| WO | WO05027645 A1 | 3/2005 |

OTHER PUBLICATIONS

Brandt, "Emulsifiers in Baked Goods" Feb. 1996, <www.foodproductdesign.com/articles/1996/02/emulsifiers-in-baked-goods.aspx> pp. 1-4.

* cited by examiner

FORMULA AND PROCESS FOR PRODUCING FROZEN SHEETED DOUGH

CROSS-REFERENCE TO RELATED APPLICATIONS

This application is a continuation of U.S. patent application Ser. No. 15/048,068, filed Feb. 19, 2016, which is a divisional of U.S. patent application Ser. No. 11/724,377, filed Mar. 15, 2007, which claims priority to U.S. Provisional Patent Application No. 60/783,090, filed Mar. 16, 2006, each of which is incorporated herein by reference in its entirety.

FIELD OF THE INVENTION

The present invention relates generally to frozen sheeted dough and more particularly provides a formulation and method for producing frozen dough which can be transferred directly from the freezer to oven without a proofing step.

BACKGROUND OF THE INVENTION

Commercially available frozen sheeted dough, including pizza dough, requires proofing prior to baking. "Proofing" is the time required for yeast in a dough to produce carbon dioxide gas so as to provide the desired volume and texture to the baked product. The proofing is typically done by the end user (e.g., the consumer or retailer) which requires about 2-4 hours. Thus the quantity of baked products needs to be anticipated in advance. Moreover, the proofing step requires additional space, equipment (such as retarders or proofers), and labor, either on the consumer end or in the manufacturing end in making the dough. All this generally inconveniences the end user.

In some other products, proofing (or part of it) can be carried out by a manufacturer of frozen dough products (pre-proofed dough), prior to freezing, so as to minimize or eliminate the need for proofing by the end user thereby reducing the preparation time for the baked product (U.S. Pat. Nos. 4,847,104 and 4,966,778 to Benjamin et al). Typically, such products require a high amount of protein (such as 16%).

Use of chemical leavening agents in place of yeast obviates the need for proofing, but it does not provide the same texture, flavor, and structure associated with proofed dough products. For example, yeast-free chemically leavened products (such as biscuit or Irish soda bread) have a completely distinct texture as compared to a pizza. Proofed products are generally lighter, less dense, less chewy, more porous, more aerated than chemically leavened unproofed products.

Frozen doughs have been described that do not require a proofing step. See U.S. Pat. No. 5,451,417. However, these doughs require so much chemical leavening agent that the resulting dough is biscuit-like in taste and texture.

SUMMARY

The present invention describes compositions and methods for a frozen, sheeted, non-laminated dough which can be directly transferred from the freezer to an oven without the need for proofing. The composition of the dough is such that it can be sheeted to a low frozen volume without using stress-free conditions and yet produces a baked product of desirable height, texture and flavor. The dough comprises flour, fat, water, yeast, dairy ingredients, dough conditioner, stabilizers such as emulsifiers and stabilizers, and chemical leavening agents.

The method of preparing the dough comprises mixing the ingredients to make the dough, resting the dough to generate gas and sheeting the dough to expel the gas generated during resting to produce a frozen dough product which does not need to be proofed prior to baking. The baked product has a desirable texture, flavor and taste. While not intending to be bound by any particular theory, it is considered that during resting, gas cells (generally referred to as air cells herein) or pockets are created which are then compressed during the sheeting process. The formulation of the dough is such that it permits the formation of air cells during resting, the collapse of the cells during sheeting and subsequent production of gas and therefore, repopulation and expansion of the existing air cells during baking. Those skilled in the art will recognize that additional air cells may also be generated during baking. However, it is considered that repopulation of existing, but collapsed cells results in the desirable texture, flavor and taste. In one embodiment, the formulation is such that during resting the gas generated is substantially by the yeast and not by chemical leavening, and during the baking stage, the gas generated is predominantly due to chemical leavening. This can be achieved in one embodiment by having the chemical leavening agents encapsulated in coating such that they are released only during baking. To prevent the chemical leavening agents from generating gas prior to baking, either the acid agent or the basic agent or both may be encapsulated.

It has been observed that with the formulation of the dough product provided herein, the compression during the sheeting process does not need to be carried out under stress-free conditions. Since the process can also be carried out under medium or high stress conditions, this results in considerable convenience for the manufacturer. In general, a reduction of height by 50% or more for a roll is considered to be high stress condition for the dough. Further, the product of the present invention can be baked in any type of oven including a microwave oven and convection oven.

DETAILED DESCRIPTION

Figure 1A:
FIGS. 1A and 1B show photographs of the product made with yeast only (1A) or with yeast and chemical leavening (1B).

The present invention will now be described in detail for specific preferred embodiments of the invention, it being understood that these embodiments are intended only as illustrative examples and the invention is not to be limited thereto.

1. Frozen Dough

The present invention relates to dough that can be compressed under high stress sheeting conditions, to a low frozen height and yet produces a baked product with desirable texture and flavor without requiring thawing and proofing prior to baking. The dough of the invention includes flour; water; chemical leavening agents; yeast; cheese or cheese substitutes; dough stabilizers, strengtheners and/or conditioners (such as hydrocolloids) to produce a frozen dough, which does not need proofing prior to baking and which upon baking results in a product that has a desirable texture and flavor. Due to the process used to make the dough, a greater reduction in the height of the sheeted dough is achieved than achieved by previous methods.

The gluten content of the dough should be in the range of from 10 to 20 wt % (not Baker's percent), with higher gluten levels generally giving a dough with better gas-holding ability. Typically, flour sold as "high gluten" generally contains about 12.5 to 15% gluten. However, it is to be understood that gluten levels can fluctuate from product to product or season to season. If desired, high-gluten flour can be used as the only flour in the dough, or it can be used with other flours.

Flours which can be used in the doughs of the present invention include, but are not limited to, wheat flour and potato flour, or combinations and mixtures thereof. The flour of the present invention may be enriched flour, i.e., flour that contains federally mandated amounts of flour, niacin, ferrous sulfate, riboflavin, enzyme, and thiamine mononitrate folate. Other types of flours may be substituted for the enriched flour or used in combination with enriched flour. The dough of the present invention may comprise additional gluten or gluten hydrolysates. Gluten is known to contain gliadin and glutenin. Accordingly, these individual components or combinations thereof may be used instead of gluten. The gliadin may be alpha, beta, gamma or omega gliadin or combinations thereof.

In one embodiment, the dough of the present invention may include flour from one or more grains (such as oats, corn, barley, wheat, rye and the like). The dough may include particulate materials from the grains (such as crushed wheat particles). Further, the dough may also include whole seeds or crushed seeds. Useful seeds are well known in the art and include sunflower seeds, caraway seeds, flax seeds, sesame seeds and the like. Thus, multigrain products can be prepared to, improve the taste and/or to add nutritional value.

Sufficient water may be added to the present doughs to achieve the desired consistency. The precise amount of water depends on factors known to those skilled in the art, including the type of yeast used, the desired final product, and the amount and type of other ingredients. Water can be added in an amount of about 45 wt % to about 75 wt %, on flour weight basis.

The frozen dough of the present invention comprises one or more types of yeast. Yeast can be purchased and used in different forms. The driest commonly used yeast, sometimes referred to as "instant" yeast, contains 3.5-6.0% moisture. Cream yeast contains about 80-85% moisture; compressed yeast contains about 66-73% moisture; and active dry yeast contains about 6-8% moisture. Other examples include baker's yeast, protected active dry yeast, frozen yeast and the like. Generally, compressed yeast can be used. However, the invention is in no way limited to compressed yeast. For a given quantity of compressed yeast, one of ordinary skill in the art could easily determine "compressed yeast equivalent," i.e., the quantity of another form of yeast having a different degree of hydration than compressed yeast, but containing the same amount of yeast as the given quantity of compressed yeast. For example, 1 lb compressed yeast is generally equivalent to about 0.3125-4 lbs. instant yeast. Similarly, 1% compressed yeast is equivalent to about 1.5-1.8% cream yeast, which is equivalent to about 0.375-0.5% active dry, which is equivalent to about 0.3125-0.4% instant yeast. The amount of yeast may be chosen to correspond to the desired density of the final baked product and the flavor profile. A suitable level of compressed yeast is between 2 to 10%. The percentages for yeast in this paragraph are not expressed as Baker's percent.

Additionally, chemical leavening is also used in the present dough. Chemical leavening agents generally comprise an acidic salt and a basic agent (generally sodium bicarbonate) and when combined these two agents will produce gas, such as carbon dioxide. In the present invention, the chemical leavening is used such that the gas from the reaction of the chemical leavening agents is generated primarily during the baking step. While not intending to be bound by any particular theory, it is considered that generation of gas by the chemical leavening agents during baking contributes to the texture of the product.

Chemical leavening agents are well known in the art. Basic agents for use as chemical leavening agents include sodium bicarbonate, potassium bicarbonate, and ammonium bicarbonate. Acidic chemical leavening agents include monocalcium phosphate monohydrate (MCP), anhydrous monocalcium phosphate (AMCP), sodium acid pyrophosphate (SAPP), glucono-delta lactone (GDL), sodium aluminum phosphate (SALP), sodium aluminum sulfate (SAS), dicalcium phosphate (DCP) and the like. Some of the acid agents have low solubility and are therefore considered to be delayed action. Such delayed action agents include SAPP, SALP, SAS and DCP. The percent gas released for these agents during baking is reported to be about 64, 69, 100 and 100 respectively. Other agents have higher solubility and are considered to be fast or intermediate acting Examples of such agents include cream of tartar, MCP and AMCP, which are reported to release 30, 40 and 50% respectively of the gas during baking.

In one embodiment, preferential release of gas by chemical leavening agents during baking step is can be achieved by the use of delayed action leavening acids. Examples of suitable chemical leavening agents are: sodium bicarbonate and an acid agent such as SAPP, SALP, SAS and DCP. In a preferred embodiment, the leavening agent in SALP. The delayed action leavening acids can be used alone or in combination with the fast acting leavening acids. However, if the fast acting acids are used alone, the resulting baked product does not have a desirable texture.

In another and preferred embodiment, the preferential release of gas from the action of chemical leavening agents during the baking step can be achieved by selective encapsulation of the chemical leavening agents in an encapsulant that releases the agents during baking temperatures and not during ambient or below ambient temperatures. For example, the chemical leavening agents can be encapsulated in a fat which has a melting profile such that it does not melt at ambient temperatures but melts at baking temperatures so that gas is primarily released only during baking. Such encapsulated agents are commercially available. Examples include Bakesure® 181 and Bakeshure® 681 (Balchem Corporation, NY). These products contain sodium bicarbonate and SALP and have a coating melt point of 61-64° C. The encapsulated leavening agents are particularly preferred if a convection oven is used for baking.

Either the acid agent or the basic agent or both may be encapsulated. If both are encapsulated, they may be encapsulated separately.

While not intending to be bound by any particular theory, it is considered that the encapsulated (or delayed action) chemical leavening provides a source of generating gas during the baking step. The gas generated by the chemical leavening agents and yeast during baking is able to easily occupy the air cells created by the action of yeast prior to freezing. The presence of chemical leavening agents is important as it was observed that the baked product produced from a frozen dough which contained only yeast and did not contain any chemical leavening appeared to have a raised edge (in the case of a pizza). This appeared to be due to the center collapsing. The product also had a gummy texture due to collapse of the air cells.

The dough of the present invention preferably comprises salt. Salt is generally added to promote better mixing, enhance flavoring, control moisture content within the dough, and/or to control yeast activity. Any commercially available fine-blending salt may be used.

The dough of the present invention also comprises an effective type and amount of a lipid source. In one embodiment, oil is used. In general, most edible oils are suitable but vegetable oil is preferred due to its taste and lubrication properties, as well as its lack of trans fat. Examples of vegetable oils that may be used in accordance with the present invention, include, but are not limited to, soybean oil, cottonseed oil, peanut oil, canola oil, corn oil, olive oil and sunflower oil. Flavored oils may also be used in addition to or in place of the oil of the present invention. Non-limiting examples of flavored oils include olive, sesame, ginger and the like.

Lipid sources may include emulsified oils. Examples of such emulsified oils are shortening, butter or margarine. Glyceride shortenings derived from animal or vegetable fats and oils including synthetically prepared shortenings are suitable for use herein. The glyceride may contain saturated or unsaturated long chain acyl radicals having from about 12 to about 22 carbon atoms generally obtained from edible oils and fats such as corn oil, cottonseed oil, soybean oil, coconut oil, rapeseed oil, peanut oil, olive oil, palm oil, palm kernel oil, sunflower seed oil, wall flower oil, lard, tallow and the like. Examples of preferred shortenings according to the present invention, include vegetable shortenings, soybean based shortenings or oils, hydrogenated soybean-based shortening or oil, corn oil, palm oil, hydrogenated palm oil, lard and tallow oils.

Additionally, the dough also comprises shortening chips. It is considered that the shortening chips, upon melting can provide air cells or pockets. The shortening chips should be such that they can withstand the process of preparation of the dough including the sheeting process and melt during the baking process. Therefore, the shortening chips used in the present invention are those that have a Mettler Dropping Point between 130° F. to 170° F. In one embodiment, the shortening chips are made of fully hydrogenated vegetable oil such as but not limited to, soybean oil. The melting point of these chips is about 160° F.

The dough of the present invention also comprises dairy ingredients such as, but not limited to, cheese, whey, casein, milk fat and the like, which can be added in any form including powder or shredded. While not intending to be bound by any particular theory, it is considered that the addition of the dairy ingredients makes the dough more machinable. In a preferred embodiment, different types of cheese can be used such as, but not limited to, Mozzarella, cheddar, Romano, Parmesan, Swiss and the like. Alternatively, or additionally, imitation cheeses, cheese analogs and substitute cheeses can also be used. A suitable cheese level is between 1-4%. Additionally, cheese flavor can also be added.

The dough of the present invention comprises emulsifiers between 0.05% to 0.5% or higher as permissible under the FDA guidelines. Suitable emulsifiers include lecithin, hydroxylated lecithin; mono, di, or polyglycerides of fatty acids, such as stearin and palmitin mono and diglycerides, polyoxyethylene ethers of fatty esters of polyhydric alcohols, such as the polyoxyethylene ethers of sorbitan distearate; fatty esters of polyhydric alcohols such as sorbitan monostearate; polyglycerol esters of mono and diglycerides such as hexaglyceryl distearate; mono- and diesters of glycols such as propylene glycol monostearate, and propylene glycol monopalmitate, succinoylated monoglycerides; and the esters of carboxylic acids such as lactic, citric, and tartaric acids with the mono- and diglycerides of fatty acids such as glycerol lacto palmitate and glycerol lacto stearate, and calcium or sodium stearoyl lactylates (SSL) and all members of the sucrose ester family thereof, all varieties of diacetyltartaric esters of fatty acids, diacetyl tartaric acid ester of monoglyceride ("DATEMS"), and the like, and mixtures thereof.

The dough of the present invention includes one or more stabilizers which are typically hydrophilic colloids. These can be natural, i.e. vegetable, or synthetic gums and may be, for example, carrageenan, guar gum, locust bean gum, alginate, xanthan gum and the like or semi-synthetic such as methylcellulose, carboxy-methylcellulose, ethylcellulose, hydroxy-propylmethylcellulose (METHOCEL F-50 HG), and microcrystalline cellulose. Typically, a gum or combination of gums is employed with a sugar, e.g. dextrose carrier. The amount of these stabilizers for this product is between 0.2 to 1.6% or higher, as permissible under FDA guidelines.

The dough may optionally contain suitable amounts of, for example 0.01 to 0.5%, flavoring agents and/or coloring agents. When using flavorings, the amount of water and salt used in the dough may have to be adjusted to take into account, for example, the amount of salt and water already contained in the flavoring. It is believed that fine tuning of the amount of salt and water in the dough would be within the ability of one of ordinary skill in the art. Examples of a suitable flavoring include, but are not limited to, butter flavor, garlic flavor, cinnamon flavor and the like. It will be appreciated by those skilled in the art that many different individual flavors can be used to achieve the ultimate desired flavor.

Vitamin and minerals may also be added to the dough as desired. Riboflavin is a commonly added vitamin to the dough. Vitamins and minerals may be added as enriched flour or added individually. In addition, calcium in absorbable or elemental form may also be added.

Sweeteners may be added to the present dough to provide for texture and/or flavor. Sweeteners such as sugars may be added for the additional purpose of providing a source of energy for the yeast. In one embodiment, dextrose and/or other sugars such as sucrose, crystalline fructose, high fructose corn syrup (HFCS) or a combination of these sugars may be used. Suitable levels of sugars are in the range of 1-5%. Alternatively or additionally artificial sweeteners such as aspartame, saccharin, sucralose, alitame, cyclamate and the like may also be used.

If desired, the dough of the present invention may contain oxidants such as azodicarbonamide, potassium iodate, Ascorbic acid and the like.

The ingredients of the present invention may be included as a combination. For example, a dough conditioner comprising one or more of the following may be used: oxidants, enzymes, emulsifiers, flour and oil. A non-limiting example of such a conditioner is Tolerance Plus. The dough conditioner may also contain ascorbic acid.

If desired, the dough of the present invention may also comprise enzymes. The enzymes may be selected from a group including, but not limited to, amylase, Proteases hemicellulase, glucose oxidase, xylanase and the like. Determination of the amount and type of enzyme is well within the purview of those skilled in the art.

After addition of all or some of the ingredients, dough mixing is performed and the dough is made as described below.

2. Preparation of Dough

In the first step, the ingredients of the dough are combined together. The combining step may include either combining all of the ingredients at once or combining different combinations of ingredients first and then combining all of the ingredients together. For example, according to one embodiment, certain of the ingredients are combined to form a pre-mix, including for example, the salt, conditioners and chemical leavening agents. Then, the pre-mix is combined with the remaining ingredients including the flour, yeast, cheese, water and lipid source. The pre-mix and/or the final mixture may include one or more additional ingredients as set forth herein.

According to a preferred embodiment of the present invention, the combining step includes mixing all the ingredients. The ingredients may be mixed with one another by mixing methods generally known in the art.

After combining, the ingredients except the shortening chips, are mixed (or further mixed if mixing steps have already taken place) by any suitable mixing apparatus, such as a Hobart mixer. By way of example only, the ingredients can be mixed for about 2 to 4 minutes on a first speed (low) and then for about 5 to 20 minutes on a second speed (high), which is faster than the first speed. For example, the ingredients are mixed for about 2 minutes on low speed and for about 10-12 minutes on high speed. Between 30 second to 3 minutes prior to the end of the mix, the shortening chips are added. If they are added too much prior to the end of the run, they tend to disintegrate and if they are added too close to the end of the mix, they do not distribute uniformly.

The dough is then rested in bulk at ambient temperature for about 5 to 50 minutes at 70 to 80° F. In one embodiment, it is rested for about 10-30 minutes, preferably for about 15-25 minutes. Those skilled in the art will recognize that a lesser time would be needed at higher temperatures. While not intending to be bound by any particular theory, it is considered that during the resting step, gas is generated primarily due to the action of yeast. In one embodiment, gas is generated during the resting stage entirely due to the action of yeast. The fermentation during rest time is critical for obtaining a desirable baked product. It was observed that the sheeted products (pizza or rolls) produced from a dough with no rest time, had an underdeveloped chemical flavor. Further, the no rest time pizza had a dense cell structure as compared to the pizza from a dough with rest time, which has open cell structure. Still further, the baked product from dough with rest time, had better texture and bite characteristics than pizza from dough with no rest time.

Following resting of the dough in bulk, the dough is sheeted. The sheeting process is a series of compression steps in which the pressure is applied to the dough so as to flatten it and remove the gas bubbles formed during resting. In the manufacturing processes used in the art, the more the number of compression steps used, the more gentle (i.e., stress-free) the process is considered to be. Such stress-free sheeting process is preferred in the industry because it is considered to improve dough quality and consistency (Seiffer, G., 2002, AIB Technical Bulletin). However, in a manufacturing plant, greater number of compression steps means more equipment and therefore more cost. Reducing the number of compression steps is not recommended because it results in increasing the stress associated with each compression step which is expected to adversely affect the integrity of the dough matrix. For the present formulation, it was unexpectedly observed that the particular combination of ingredients enabled the application of high stress compressions without adversely affecting the quality and texture of the baked product. Such an unexpected result not only helps in the manufacturing plant, but also reduces the freezer storage space requirements by producing frozen sheeted dough of comparatively lower height.

A high stress sheeting process typically involves a relatively low number of compressions with the dough being quickly processed from one roller to the next over a short distance. Thus, the process does not allow the dough to significantly relax in between the compressions. For example, in the present invention, between 2 to 5 compressions can be used. One feature of the high stress process is the speed of the conveyor and in one embodiment where a series of 3 compressions were used, the speed of the dough (on the conveyor) was about one foot per second and it took about 7 seconds for the dough to travel from one roller to the next.

After the high-stress sheeting process, in the case of pizza, a bread crumb product can be applied to the bottom of the sheeted dough. The bread crumb product typically comprises bleached wheat flour, yeast, sugar and salt. Instead of a bread crumb product, other similar products comprising cornmeal, corn grits, sesame seeds, poppy seeds etc. can also be used. In one embodiment, the bread crumb product is also mixed with the dough.

The breadcrumbs can be added back at the rate of 1.5-2.0% flour basis.

The sheeted dough after the high stress compressions can also be used for other sheeted products such as rolls. For this, the sheeted dough is rolled from end to end (also known as torpedoed) into rolls. In one embodiment, to make cinnamon rolls, a cinnamon comprising paste can be applied to one side of the sheet. For other types of rolls, other flavoring pastes can be used. Such pastes are well known in the art. It has been observed that brushing the sheet with shortening or oil before applying the paste, provides a better spread of the cinnamon roll giving the roll a bigger diameter. Because of reduced height of each sheet after compression in the present invention compared to similar weight cinnamon roll sheets of currently available products, the total cross section of a rolled cinnamon roll is less than that of comparable products. This feature provides significant commercial advantage during storage of the frozen products.

At the end of the process, the height of the sheeted dough is significantly less than the height prior to sheeting. The sheeted dough can then be cut into the desired shape and size and processed for freezing. Typically, the dough is frozen, packaged and then kept in long term storage in the freezer. In one embodiment, height reduction from the range of 1.9"-2.0" before sheeting to 0.210"-0.250" after the third compression was observed. Thus by the process of the present invention a height reduction of from 80-95% can be achieved using between 2 to 5 compressions. Thus, this invention provides for a reduction of height of sheeted dough by at least 80%. In various embodiments, this invention provides for a reduction in height of 80, 81, 82, 83, 84, 85, 86, 87, 88, 89, 90, 91 92, 93, 94, 95 percent. The above reduction in height can be achieved by using 2, 3, 4 or 5 compressions. In one embodiment, it is achieved by using 3 compressions.

Optionally, the shaped dough is topped with at least one topping and/or flavoring prior to freezing the dough.

The dough is frozen by methods known in the art. When freezing the dough, a uniform cooling rate throughout the dough is desirable. A convenient method for freezing the shaped dough is by using spiral freezer (−30° F. to −62° F.). Carbon dioxide optionally may be used for gradual freezing (0° F. to −10° F.).

For prolonged stability, the frozen dough is preferably stored at a temperature in a range of from about −42° F. to about −10° F., more preferably at a temperature in the range of from about −20° F. to about −12° F. In frozen state the dough pieces are stored for a desired period of time.

This product is ready for baking without additional time consumption on thawing and proofing. The baking can be carried out in a routine manner in a standard convection oven or any other type of oven. Because of the unique combination of ingredients and the process of formation and refilling of air cell, the dough crust performs well in various oven formats, such as impingement, convection, deck and hybrid. As an example, it has been observed that a pizza dough made by the present invention rises appreciably in the microwave oven.

In the present invention, a reduced frozen dough height is achieved without compromising the final baked product height. Thus, the present invention provides for at least a 100% increase in the height of the baked product compared to the frozen product height. In various embodiments, the height increase is at least 105, 110, 115, 120, 125 and 130%. Thus compared to currently available products, this invention provides for a reduction in the frozen product height without compromising the final baked product height.

The following examples are provided to further illustrate the invention.

3. EXAMPLES

Example 1

This example provides ranges of components for a frozen sheeted pizza dough.

| Ingredient | Range (% of flour) | Embodiment 1 |
|---|---|---|
| Flour | 100 | 100% |
| Gluten | 1-4 | 1 |
| Compressed yeast | 2-10 | 4 |
| Deactivated yeast | 0.1-0.5 | — |
| Sugar | 1-3 | 3 |
| Vegetable oil | 0-5.0 | 2 |
| Cheese and/or cheese flavor and/or imitation cheeses or analogs | 1-5 | 2 |
| Chemical leavening | 1-3 | 2 |
| Salt | 1-3 | 2 |
| Water | 45-75 | 60 |

The above ingredients shown under Embodiment 1 were mixed together. Other ingredients include dough conditioners, stabilizers etc. All ingredients were mixed together using a Hobart mixer (Urban Raiff & Sons, Inc., Buffalo, N.Y.). Prior to the end of mixing in the mixer, shortening chips were added. The dough was rested for 10-30 minutes and then sheeted using three rounds of compression. A bread crumb mix was applied to one side of the dough. Cheese topping was added on the dough. The dough was then frozen. For using the product, frozen pizza dough was directly placed in an oven and baked until a golden brown color was developed and the cheese was melted.

Example 2

This example provides ranges and one embodiment for frozen sheeted cinnamon roll dough. The ingredients were mixed as described above. The frozen dough was directly transferred to an oven for baking.

| Description | Range (% of flour) | Embodiment |
|---|---|---|
| High gluten flour | 100 | 100 |
| Salt | 0.2-2.5 | 1 |
| Sugar | 3-10 | 8 |
| HFCS | 8-16 | 10 |
| Shortening | 3-24 | 4 |
| Oil | 2-10 | 4 |
| Emulsifier & dough Conditioner | 0-0.5 | 0.5 |
| Powdered whole egg | 2-6 | 4 |
| Dairy ingredients (non-fat dry milk, butter milk) | 5-15 | 7 |
| Cheese or cheese substitute | 1-5 | 2 |
| Diastatic malt | 0-0.5 | 0.3 |
| Cinnamon flavor | 0.1-0.4 | 0.3 |
| Beta carotene | 0-0.05 | 0.03 |
| Encapsulated leavening | 1-4 | 3 |
| Shortening flakes | 1-6 | 4 |
| Yeast | 12-22 | 20 |
| Molasses | 2-6 | 5 |
| Hydrocolloids (fiber, gum, starch) | 0-2 | 1 |
| Water | 32-40 | 38 |

A cinnamon roll of high spread and desirable texture and flavor was obtained.

Example 3

In this example, comparative studies were carried out between the dough of the present invention and other doughs. The comparative doughs were 1) a pre-proofed dough and 2) a dough of the present invention that was not directly transferred from the freezer to oven, but rather, retarded overnight, proofed before being topped and then baked (referred to below as "Regular sheeted"). Therefore, it is representative of the traditional pizza dough. Scoring was carried out by impartial external panel using standard procedures. It was observed that a pizza made from the present dough as described herein scored significantly higher than a pre-proofed frozen dough pizza in the following categories: height of the crust, size of air cells, crust color and overall appearance, and was significantly different from the Regular sheeted product for ease of bite off and ease of swallowing.

| Parameter | Present Invention | Pre-Proofed | Regular Sheeted |
|---|---|---|---|
| Baked crust height | 6.49$^a$ | 5.67$^b$ | 6.76$^a$ |
| Size of air cells | 6.07$^a$ | 5.38$^b$ | 6.62$^a$ |
| Crust color | 5.75$^a$ | 4.75$^b$ | 7.29$^c$ |
| Overall appearance | 5.96$^a$ | 5.07$^b$ | 7.18$^a$ |
| Ease of bite off | 6.3$^a$ | 7.05$^b$ | 6.7$^{ab}$ |
| Ease of swallowing | 6.5$^a$ | 6.9$^a$ | 6.6$^a$ |

Means with one superscript letter in common are not significantly different from each other at the 95% confidence level (p<0.05). The JAR (just-about-right) value for all of these attributes is 6.0.

Example 4

This example compares the height reduction of the dough during the sheeting process. The ingredients were as shown under Embodiment 1 in Example 1. Following mixing, the dough was rested and then subjected to three compression rolls. The numbers were as follows: 1$^{st}$ Reduction Roll: 1.935" reduced to 1.2"; 2$^{nd}$ Reduction Roll: 1.1" reduced to 0.554"; 3$^{rd}$ Reduction Roll: 0.466" reduced to 0.177".

Example 5

This example also compares the height of the baked product. Starting with a frozen pizza of height 0.220", the product rose to a final baked height of 0.500"; this corresponds to an increase of 127%. For a comparative pre-proofed frozen dough pizza, the raw height was 0.450" which rose to 0.550" after baking; which corresponds to an increase of 22%.

Example 6

Figure 1B:

In this example, the product of the present invention (containing yeast and double action leavening agents) was compared to a product made from a dough composition which contained only yeast and no leavening agents. It was observed that the product made from dough containing yeast only (FIG. 1A) had the appearance of raised edge due to the center collapsing. Additionally the texture was also gummy. In contrast, the air cell structure of the product made from the dough containing both the chemical leavening agents and yeast (FIG. 1B) had a better air cell structure.

Example 7

Figure 2A:
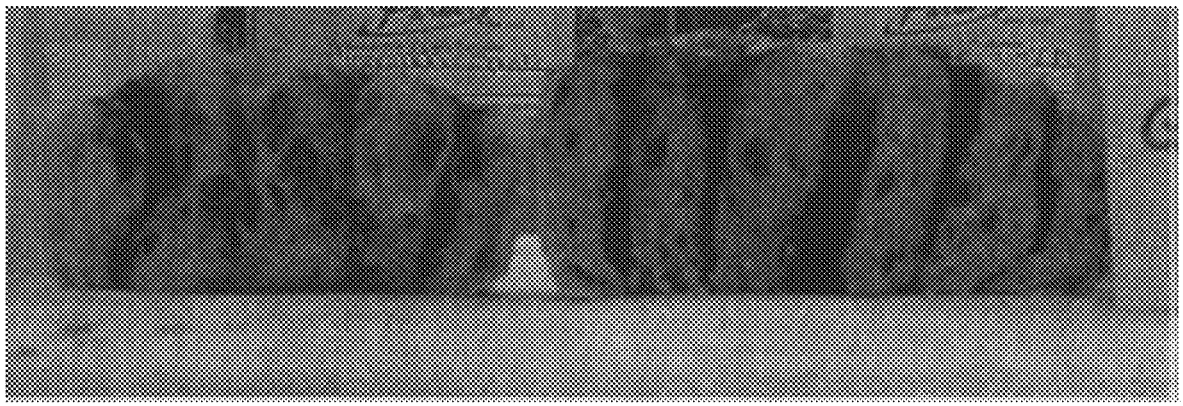
FIG. 2A shows photographs of baked cinnamon rolls for the product of the present invention (right) and a comparative product (left).
Figure 2B:
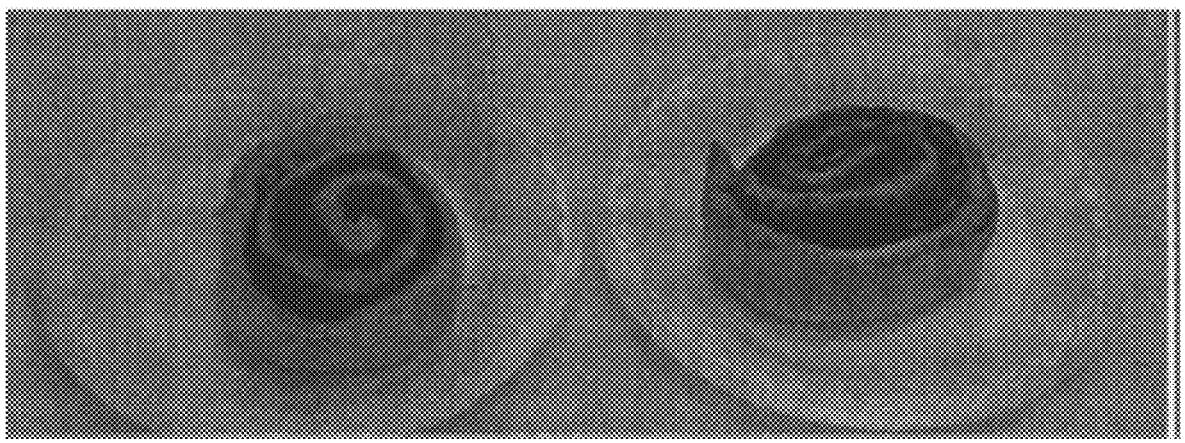
FIG. 2B shows another view of the baked cinnamon rolls from FIG. 2A for the product of the present invention (right) and the comparative product (left).

In this example, the overall appearance and volume of baked cinnamon rolls of the present invention and a comparative product on the market was compared when both were baked in a microwave oven. As shown in FIGS. 2A and 2B, the product of the present invention (right in both 2A and 2B) had better air cell structure and higher volume than the comparative product (left in both 2A and 2B).

Example 8

Figure 3A:
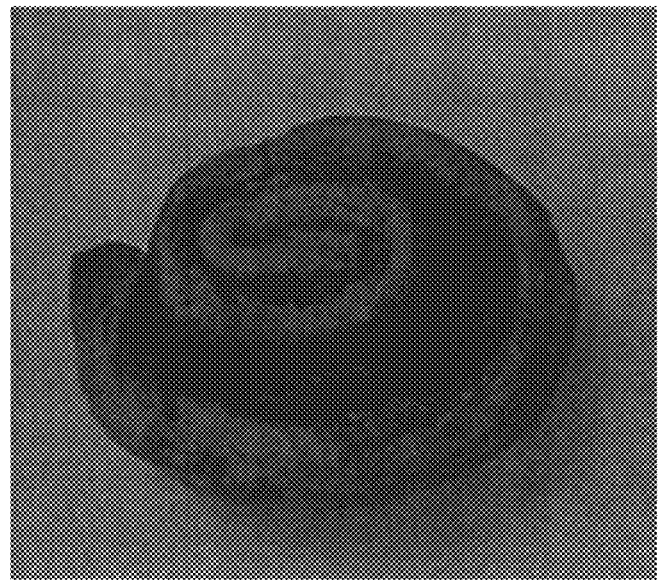
FIGS. 3A and 3B show photographs of baked cinnamon rolls for a product made by brushing the sheeted dough without (FIG. 3B) or with oil/shortening (FIG. 3B) prior to applying the cinnamon paste.
Figure 3B:
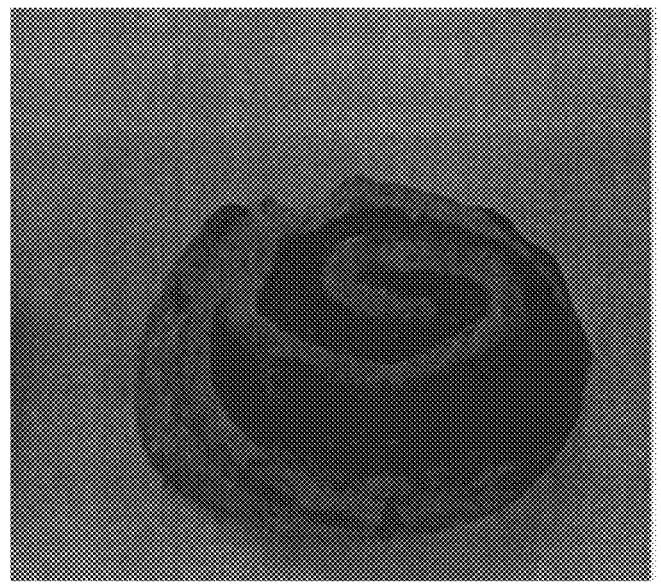

In this example, the sheeted dough was brushed with oil or shortening before covering with cinnamon paste and folding end to end prior to freezing. When compared to the baked product without the oil/shortening brushing (FIG. 3B), it was observed that the percent increase in weight and depth as well as the specific volume of the product that was made with brushed oil (FIG. 3A) was greater.

Example 9

Figure 4A:
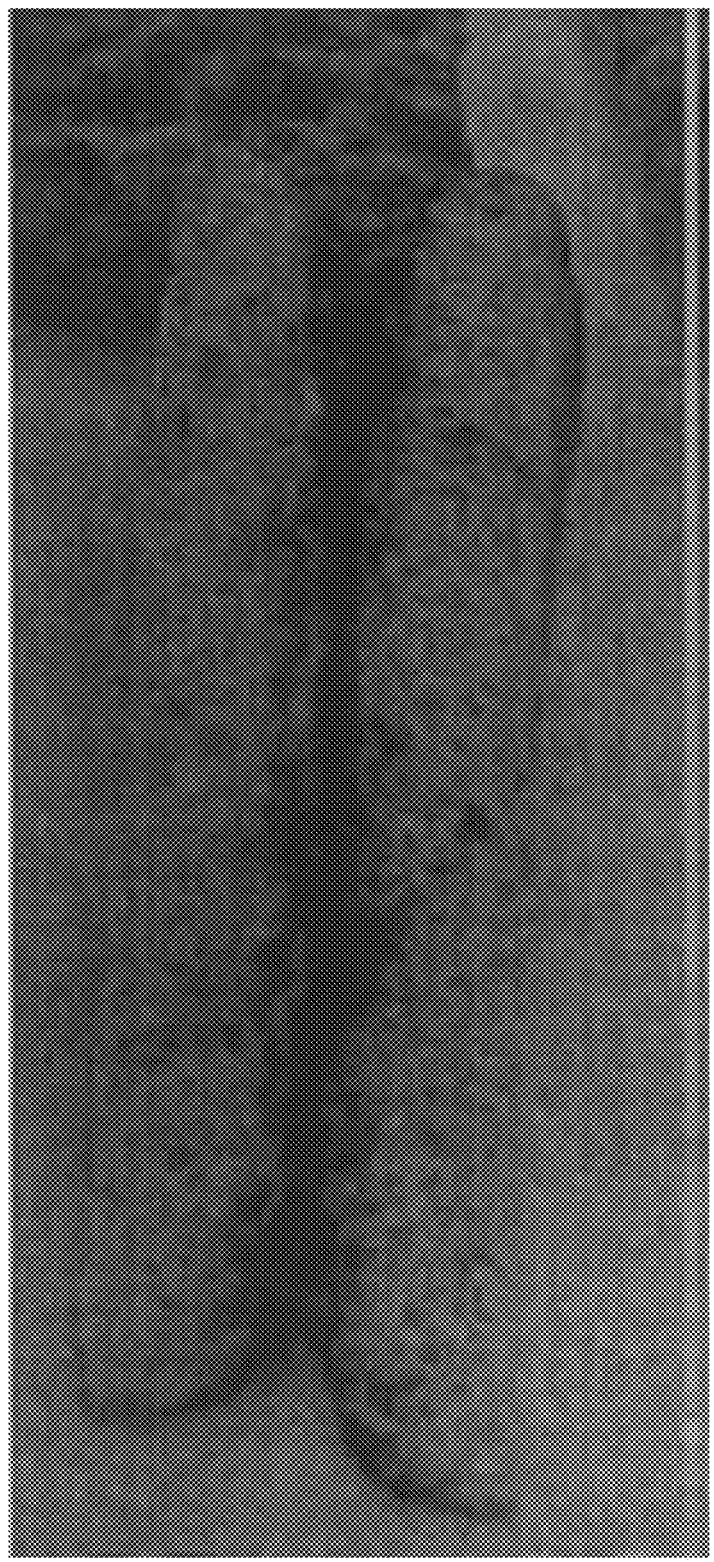
FIGS. 4A and 4B show photographs of pizza made with encapsulated leavening agents (4A) or with non-encapsulated chemical leavening agents (4B).
Figure 4B:
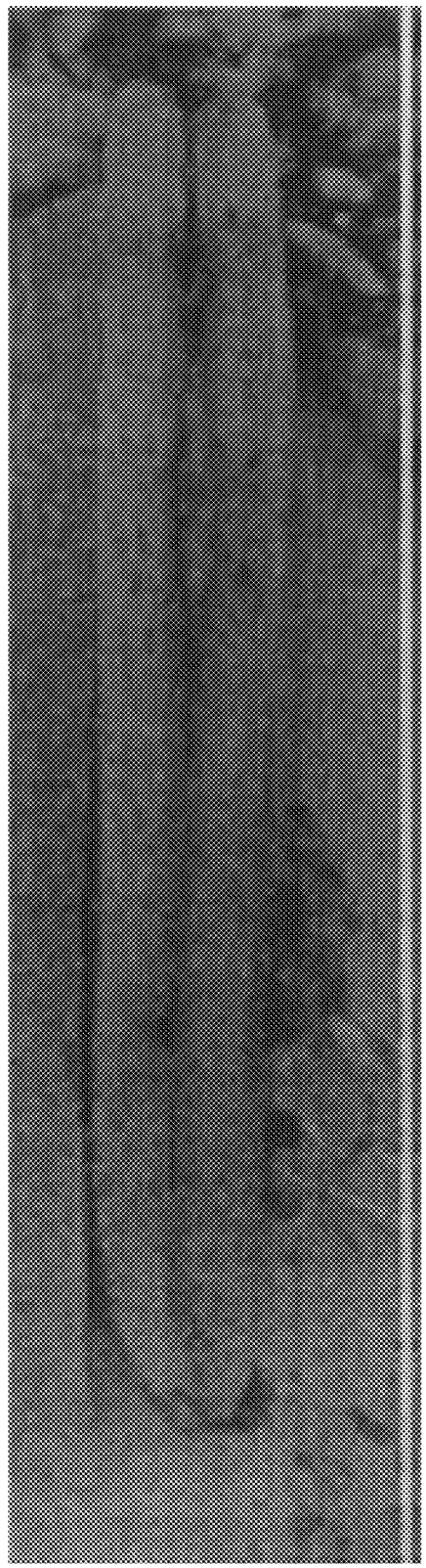

This example describes the effect of using uncapsulated double acting chemical leavening agents versus encapsulated SALP and Sodium Bicarbonate. Both samples also contained yeast as described in the embodiments above. The 16 inch pizza product was baked in a convection oven at 375° F. for 10 minutes. As seen in FIGS. 4A and 4B, the pizza with encapsulated Soda and SALP (FIG. 4A) indicates a greater height and more open air cell structure as compared to non-encapsulated double acting baking powder (FIG. 4B).

While particular embodiments have been described above, routine modification to these embodiments will be apparent to those skilled in the art and such modifications are intended to be included within the scope of the present invention.

What is claimed is:

1. A non-laminated dough comprising:
   100 wt % flour, based on weight of flour;
   up to 34 wt % lipid source, based on weight of flour;
   at least 32 wt % water, based on weight of flour;
   one or more chemical leavening agents;
   yeast;
   a dairy ingredient; and,
   shortening chips;
   wherein the dough has a gluten content of 10 wt % to 20 wt %, the shortening chips comprise a fully hydrogenated vegetable oil, and the shortening chips have a Mettler Dropping Point from 160° F. to 170° F.

2. The non-laminated dough of claim 1, wherein the chemical leavening agents comprise delay-action chemical leavening agents, coated chemical leavening agents, or combinations thereof so as to cause the chemical leavening agents to primarily react during baking.

3. The non-laminated dough of claim 1, wherein the dough further comprises 0.2 wt % to 1.6 wt % of a dough conditioner, wherein the dough conditioner comprises hydrophilic colloids comprising one or more compounds selected from the group consisting of carrageenan, guar gum, locust bean gum, alginate, xanthan gum, methylcellulose, carboxy-methylcellulose, ethylcellulose, hydroxy-propylmethylcellulose, and microcrystalline cellulose.

4. The non-laminated dough of claim 1, wherein the dough further comprises 0.05 wt % to 0.5 wt % of an emulsifier, wherein the emulsifier comprises one or more compounds selected from the group consisting of lecithin, hydroxylated lecithin, monoglycerides of fatty acids, diglycerides of fatty acids, polyglycerides of fatty acids, polyoxyethylene ethers of fatty esters of polyhydric alcohols, fatty esters of polyhydric alcohols, polyglycerol esters of monoglycerides, polyglycerol esters of diglycerides, monoesters of glycols, diesters of glycols, propylene glycol monopalmitate, succinoylated monoglycerides, esters of carboxylic acids, glycerol lacto palmitate, glycerol lacto stearate, calcium stearoyl lactylates, sodium stearoyl lactylates, diacetyl tartaric esters of fatty acids, and diacetyl tartaric acid ester of monoglyceride.

5. The non-laminated dough of claim 1, wherein the dairy ingredient comprises one or more ingredients selected from the group consisting of cheese, cheese substitute, whey, casein, and milk fat.

6. The non-laminated dough of claim 1, wherein the dough further comprises 1.5 wt % to 2 wt % bread crumb product.

7. The non-laminated dough of claim 1, wherein the fully hydrogenated vegetable oil is soybean oil.

8. The non-laminated dough of claim 7, wherein the Mettler Dropping Point is 160° F.

9. A non-laminated pizza dough comprising:
100 wt % flour, based on weight of flour;
up to 34 wt % lipid source, based on weight of flour;
at least 32 wt % water, based on weight of flour;
0.05 wt % to 0.5 wt % emulsifier, based on weight of flour;
0.2 wt % to 1.6 wt % dough conditioner, based on weight of flour;
one or more chemical leavening agents;
yeast;
a dairy ingredient; and,
shortening chips;
wherein the dough has a gluten content of 10 wt % to 20 wt %, the lipid source comprises an oil,
the one or more chemical leavening agents are encapsulated with a coating having a melting temperature that is greater than an ambient temperature of 70° F. to 80° F., the shortening chips comprise a fully hydrogenated vegetable oil, and the shortening chips have a Mettler Dropping Point from 160° F. to 170° F.

10. The non-laminated pizza dough of claim 9, wherein the dough conditioner comprises hydrophilic colloids comprising one or more compounds selected from the group consisting of carrageenan, guar gum, locust bean gum, alginate, xanthan gum, methylcellulose, carboxy-methylcellulose, ethylcellulose, hydroxy-propylmethylcellulose, and microcrystalline cellulose.

11. The non-laminated pizza dough of claim 9, wherein the emulsifier comprises one or more compounds selected from the group consisting of lecithin, hydroxylated lecithin, monoglycerides of fatty acids, diglycerides of fatty acids, polyglycerides of fatty acids, polyoxyethylene ethers of fatty esters of polyhydric alcohols, fatty esters of polyhydric alcohols, polyglycerol esters of monoglycerides, polyglycerol esters of diglycerides, monoesters of glycols, diesters of glycols, propylene glycol monopalmitate, succinoylated monoglycerides, esters of carboxylic acids, glycerol lacto palmitate, glycerol lacto stearate, calcium stearoyl lactylates, sodium stearoyl lactylates, diacetyl tartaric esters of fatty acids, and diacetyl tartaric acid ester of monoglyceride.

12. The non-laminated pizza dough of claim 10, wherein the emulsifier comprises one or more compounds selected from the group consisting of lecithin, hydroxylated lecithin, monoglycerides of fatty acids, diglycerides of fatty acids, polyglycerides of fatty acids, polyoxyethylene ethers of fatty esters of polyhydric alcohols, fatty esters of polyhydric alcohols, polyglycerol esters of monoglycerides, polyglycerol esters of diglycerides, monoesters of glycols, diesters of glycols, propylene glycol monopalmitate, succinoylated monoglycerides, esters of carboxylic acids, glycerol lacto palmitate, glycerol lacto stearate, calcium stearoyl lactylates, sodium stearoyl lactylates, diacetyl tartaric esters of fatty acids, and diacetyl tartaric acid ester of monoglyceride.

13. The non-laminated pizza dough of claim 9, wherein the dough further comprises 1.5 wt % to 2 wt % bread crumb product.

14. The non-laminated pizza dough of claim 12, wherein the dough further comprises 1.5 wt % to 2 wt % bread crumb product.

15. The non-laminated pizza dough of claim 9, wherein the dairy ingredient comprises one or more ingredients selected from the group consisting of cheese, cheese substitute, whey, casein, and milk fat.

16. The non-laminated pizza dough of claim 14, wherein the dairy ingredient comprises one or more ingredients selected from the group consisting of cheese, cheese substitute, whey, casein, and milk fat.

17. The non-laminated pizza dough of claim 9, wherein the dough comprises by wt % flour:
flour 100%,
gluten 1-4%,
compressed yeast 2-10%,
deactivated yeast 0.1-0.5%,
sugar 1-3%,
vegetable oil up to 5%,
cheese and/or 1-5%,
imitation cheese
chemical leavening agent 1-3%,
salt 1-3%,
water 45-75%.

18. The non-laminated pizza dough of claim 16, wherein the dough comprises by wt % flour:
flour 100%,
gluten 1-4%,
compressed yeast 2-10%,
deactivated yeast 0.1-0.5%,
sugar 1-3%,
vegetable oil up to 5%,
cheese and/or 1-5%,
imitation cheese
chemical leavening agent 1-3%,
salt 1-3%,
water 45-75%.

19. The non-laminated pizza dough of claim 9, wherein the fully hydrogenated vegetable oil is soybean oil.

20. The non-laminated pizza dough of claim 19, wherein the Mettler Dropping Point is 160° F.

21. A non-laminated dough comprising:
100 wt % flour, based on weight of flour;
up to 34 wt % lipid source, based on weight of flour;
at least 32 wt % water, based on weight of flour;
one or more chemical leavening agents;
yeast;
one or more sweeteners;
salt;
a dairy ingredient; and,
shortening chips;
wherein the dough has a gluten content of 10 wt % to 20 wt %, the shortening chips comprise a fully hydrogenated vegetable oil, and the shortening chips have a Mettler Dropping Point from 160° F. to 170° F.

22. The non-laminated dough of claim 21, wherein the dough comprises by wt % flour:
flour 100%,
gluten 1-4%,
compressed yeast 2-10%,
deactivated yeast 0.1-0.5%,
sugar 1-3%,
vegetable oil up to 5%,
cheese and/or 1-5%,
imitation cheese
chemical leavening agent 1-3%,
salt 1-3%,
water 45-75%.

23. The non-laminated dough of claim 21, wherein the dough comprises by wt % flour:
gluten flour 100%,
compressed yeast 12-22%,
chemical leavening agent 1-4%,
sweetener 13-32%,
lipid source 5-34%,
emulsifier 0-0.5%, dairy ingredient 6-20%,
stabilizer 0-2%,
salt 0.2-2.5%,
water 32-40%.

24. The non-laminated dough of claim 21, wherein the sweeteners comprise sugars comprising one or more compounds selected from the group consisting of dextrose, sucrose, crystalline fructose, and high fructose corn syrup; and/or, artificial sweeteners comprising one or more compounds selected from the group consisting of aspartame, saccharin, sucralose, alitame, and cyclamate.

25. The non-laminated dough of claim 21, wherein the fully hydrogenated vegetable oil is soybean oil.

26. The non-laminated dough of claim 25, wherein the Mettler Dropping Point is 160° F.

* * * * *